United States Patent

[11] 3,581,967

| | | |
|---|---|---|
| [72] | Inventor | Cameron R. Benson |
| | | Saint John, New Brunswick, Canada |
| [21] | Appl. No. | 23,758 |
| [22] | Filed | Mar. 30, 1970 |
| [45] | Patented | June 1, 1971 |
| [73] | Assignee | T. S. Simms & Co. Limited |
| | | Saint John, New Brunswick, Canada |

[54] NAILING MACHINE
7 Claims, 3 Drawing Figs.

[52] U.S. Cl. .................................................. 227/112,
227/118
[51] Int. Cl. ...................................................... B27f 7/02
[50] Field of Search ........................................... 227/99,
100, 112, 117, 118, 124, 153

[56] References Cited
UNITED STATES PATENTS

| | | | |
|---|---|---|---|
| 2,273,268 | 2/1942 | Hunter et al. ................. | 227/112 |
| 2,504,577 | 4/1950 | Paxton ..................... | 227/118X |
| 3,305,155 | 2/1967 | Willis ........................ | 227/112X |
| 3,381,870 | 5/1968 | Haskins ..................... | 227/153X |

*Primary Examiner*—Granville Y. Custer, Jr.
*Attorney*—Fetherstonhaugh and Co.

ABSTRACT: A nailing machine for simultaneously driving nails into a workpiece from two opposed directions and having a pair of nail chucks, one above the other, a mechanism to bring the chucks together while simultaneously gripping the workpiece between clamping shoes carried by the upper chuck and a work table and an arrangement for feeding nails into the chucks which includes a first tube for delivering nails to the upper chuck by gravity and a second tube for delivering nails to the lower chuck under the influence of air blasts, and a nail pickoff mechanism for dropping nails into the upper end of the tubes in timed relationship with the driving of the nails.

PATENTED JUN 1 1971

INVENTOR.
CAMERON R. BENSON

BY Featherstonhaugh & Co.

ATTORNEYS

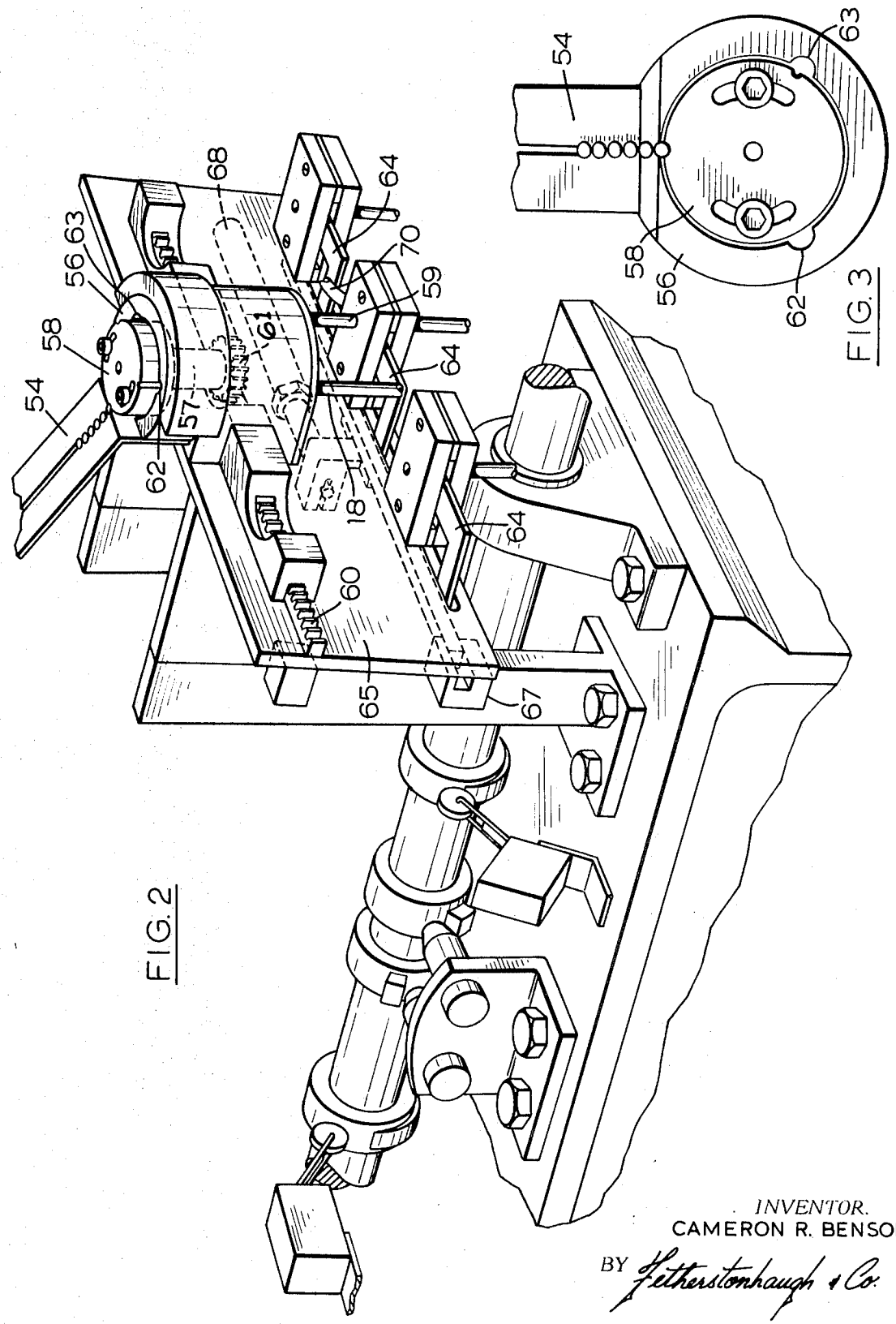

NAILING MACHINE

FIELD OF INVENTION

This invention relates to nailing machines and is specifically concerned with a nailing machine having particular utility in the manufacture of paint brushes. In that particular application, the machine is employed to nail ferrules to handles and it does so by driving nails simultaneously from each side.

PRIOR ART

Earlier nailing machines have been capable of driving nails from one side only, thus requiring a turn-around device for inverting the brush handle and ferrule combination to feed it back through the same machine or to feed it to a second machine in order to drive nails from the second side. The chief disadvantage of using a turnover device, apart from the cost of the device, is the time consumed in the turnover operation.

SUMMARY OF INVENTION

The nailing machine of the present invention provides a machine for nailing two objects together simultaneously from each side which has specific utility in the manufacture of paint brushes.

The nailing machine of this invention comprises a frame, a pair of vertically opposed nailing chucks and means for vertically reciprocating the chucks for simultaneously driving a first nail from above and a second nail from below into a workpiece and means for feeding nails to said chucks and consisting of a nail pickoff device for receiving nails from the lower end of a sloped track leading from a nail storage and delivery unit and for ultimately feeding nails first to a tube leading to the upper chuck and secondly to a tube leading to the lower chuck and including means for feeding air blasts into said second tube as to drive nails received therein into said second chuck.

The invention will be more thoroughly understood from the following description of preferred embodiment thereof as read in conjunction with the accompanying drawings.

In the drawings,

FIG. 2 is a perspective view of a modified nail pickoff device forming a part of the machine illustrated in FIG. 1; and FIG. 3 is a top view of the nail pickoff mechanism of the type used on the machine as illustrated in FIG. 1.

Figure 1:
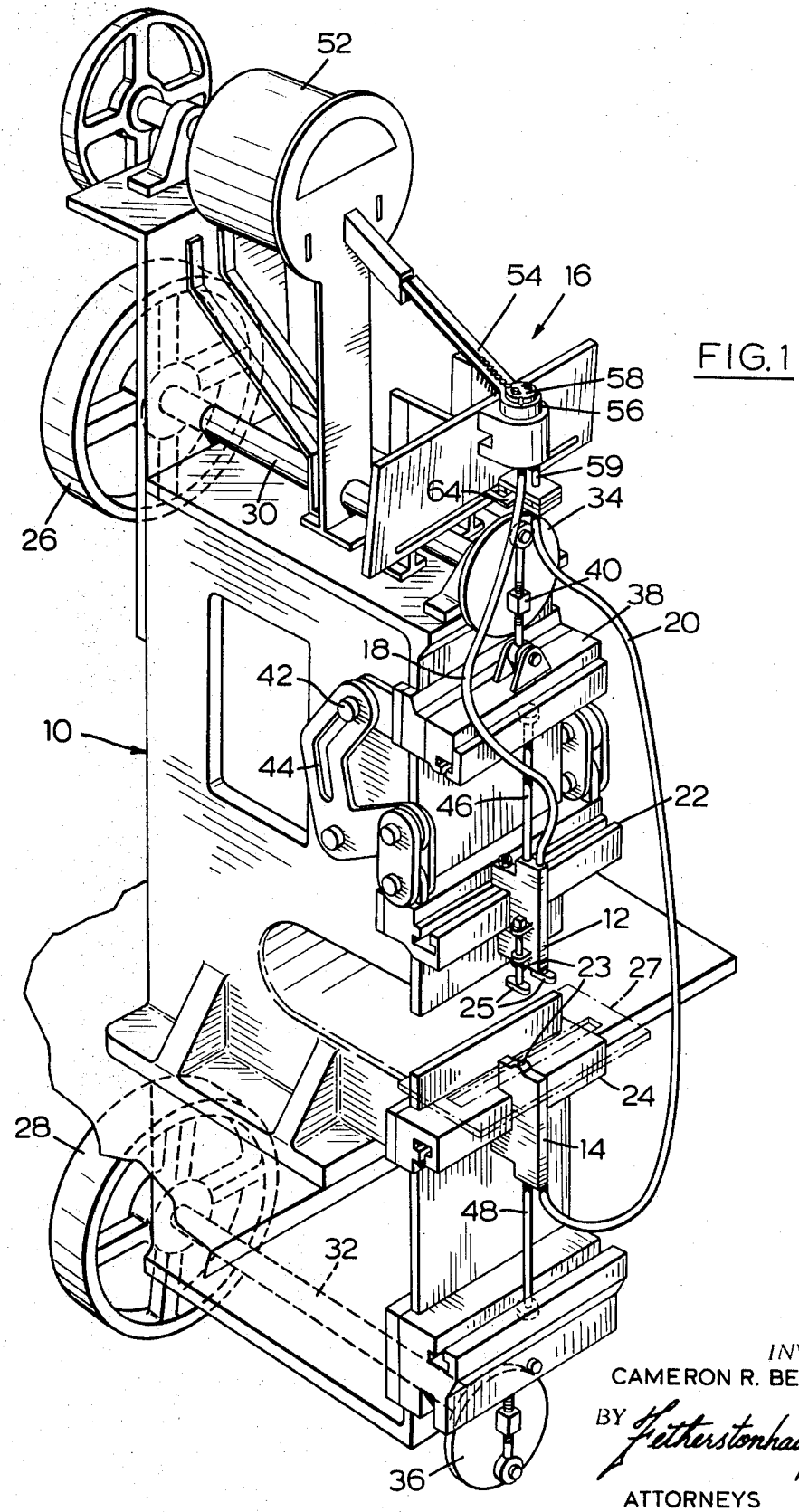
FIG. 1 is a perspective view of a double nailing machine in accordance with this preferred embodiment of the invention.

Referring to FIG. 1, the illustrated machine essentially consists of a frame 10 carrying a top chuck 12 for driving nails from above into a workpiece, a second nailing chuck 14 for driving nails into the workpiece from below and a nail pickoff device 16 for alternately delivering nails to tubes 18 and 20 leading to chucks 12 and 14, respectively. The particular machine illustrated is specially adapted for nailing paint brush ferrules to handles, but it should be understood that the machine of the invention is capable of use in nailing together other articles.

Chucks 12 and 14 are carried on chuck holders 22 and 24, respectively, with the lower chuck holder 24 being stationary but the upper chuck holder 22 being adapted for vertical reciprocation. Attached to upper chuck 12 are two spring-loaded clamping shoes 25. Thus, the operational effect is that when a workpiece moves into position to be nailed, the upper chuck holder drops down to squeeze the workpiece between the clamping shoes and a support table 27, whereupon both chucks simultaneously drive their nails through orifices 23.

The driving mechanism for operating the chuck holders and the chucks include an electric motor, not shown, which is connected to a pair of flywheels 26 and 28 which are rotatably mounted on main shafts 30 and 32. Actually, the flywheels are connected to the drive shafts through single cycle clutches so that the flywheel motion is imparted to the drive shafts through these clutches. At their opposite ends, the main drive shafts carry an upper eccentric 34 and a lower eccentric 36. As upper eccentric 34 turns, it pushes reciprocal block member 38 downwardly through the medium of an adjustable push rod 40. Block member 38 carries a pair of cam followers 42 which connect with guides 44 so that as block member 38 moves downwardly, it imparts a downward motion to upper chuck holder 22. This places the clamping shoes 25 in contact with the workpiece and lowers the upper chuck to the surface of the workpiece. Further rotation of upper eccentric 34 now produces no further downward motion of chuck holder 22 as the followers 42 slide freely in the lower portions of the slotted guides 44. However, block member 38 does continue to move a nail driver 46 so as to drive downwardly the nail held in chuck 12.

Simultaneously, with the downward movement of nail driver 46, the lower eccentric 36 drives the second nail driver 48 upwardly within lower chuck 14.

The arrangement for feeding nails to the chucks consists of a storage hopper 52, a delivery track 54, the pickoff device 16, previously mentioned, and the two feeding tubes 18 and 20 leading to chucks 12 and 14, respectively. Hopper 52 may consist of a rotatable barrel-type of arrangement or a vibrating pan assembly, both of which are well known per se, and are adapted to feed nails down the delivery track 54 to the pickoff device 16.

The pickoff device consists of a fixed outer ring 56 and an inner rotatable disc 58. The outer edge of the latter is notched at two points approximately 120° apart, with these notches being sized to accommodate the shanks of the nails but being smaller than the nailheads. The inner edge of the outer ring 56 is also notched at two points with the notches extending through the depth of the ring to connect with the upper ends of tube 18 and an intermediate tube 59 through which nails eventually reach tube 20 as described hereinafter. The latter notches are large enough to permit nails received to drop into the tubes.

It should be noted that the machine as illustrated in FIG. 1 has only one pickoff device 16. As a preferred embodiment, however, the machine would be provided with three or more pickoff devices and delivery tracks, each of which would feed a different pair of chucks. Thus, FIG. 2 differs from FIG. 1 to show the setup for three pickoff devices, all of which are operated by the same drive mechanism. The latter consists of a toothed rack 60 which meshes with pinion gears 61 carried at the lower ends of central shafts 57 projecting downwardly from discs 58. Thus, as rack 60 is reciprocated back and forth, the discs are turned through 120° arcs to pickoff nails from the lower end of delivery tracks 54 and to feed them alternately to tubes 18 and 59.

As can then be appreciated from FIG. 3, rotation of the inner disc through an arc of 120° counterclockwise would deliver the nail at the lower end of track 54 to notch 62 and that a subsequent 120°° rotation clockwise will deliver the next nail to notch 63. Nails delivered to notch 62 fall into tube 18 for direct delivery to upper chuck 12 while those delivered to notch 63 fall into intermediate tube 59 and come to rest against a horizontal plate 64. This plate is adapted to move in and out of its position beneath tube 59 so that when it is moved out of this position, the nail held in tube 59 falls into tube 20 leading to lower chuck 14. As plate 64 moves out of its position beneath tube 59 and after the nail falls into the tube 20 and plate 64 again returns to its original position under tube 59, a blast of air is fed into tube 20 through conduit 70 to drive the nail into the lower chuck.

The movements of rack 60 and plate(s) 64, and the air blasts fed to the tube 20, are all controlled by air cylinders which are, in turn, operated by cams and switches operated from shaft 30 as shown schematically in FIG. 2.

To summarize, the operation of the nail pickoff device is as follows. It is assumed that the cycle has reached the point at which the previous cycle has loaded both chucks with nails, with the nail in the lower chuck being held in position by a flow of air through tube 20; that is, air is being introduced into tube 20 through conduit 70 and plate 64 is holding a nail in tube 59.

The cycle begins as the clutches connecting the flywheels with shafts 30 and 32 are engaged simultaneously. The resultant rotation of shaft 30 triggers the appropriate switches to move rack 60 and rotate the inner disc of the pickoff mechanism to deliver a nail to notch 62 and down into tube 18. This nail travels down tube 18 while the nail already delivered to chuck 12 is being driven into the workpiece.

During the time when the nails in the chucks are being driven into the workpiece, the flow of air into tube 20 is cut off and plate 64 moves out of its position beneath intermediate tube 59, thus allowing the nail held on the plate to drop into tube 20. Immediately, plate 64 moves back into position below tube 59 and air is again fed into tube 20, thus driving the nail just introduced into this tube into chuck 14.

What I claim as my invention is:

1. A nailing machine for driving nails simultaneously from opposed directions, said machine comprising a pair of nail chucks being arranged one above the other for holding a pair of nails in a position whereby they may be driven into an article to be nailed, simultaneously from above and below, clamping means for holding the article as it is nailed, a means for moving said chucks towards and away from each other whereby they may be brought into contact with the article, a nail driver associated with each chuck for driving the nails held within the chucks into the article, means for operating said drivers in timed relationship with the movement of said chucks, whereby upon completion of the clamping and moving down of the chucks to the workpiece the nails are driven into the workpiece, and a means for feeding nails to said chucks, said nail-feeding means including a first tube for delivering nails to the upper chuck by gravity and a second tube for delivering nails to the lower chuck under the influence of air blasts.

2. A nailing machine as claimed in claim 1, in which said nail feeding means includes a pickoff mechanism for dropping nails, head ends up, into said tubes and control means for automatically operating said pickoff mechanism in timed relationship with the operation of the said chuck, whereby the nails picked off during said nailing operation are used for the next operation.

3. A nailing machine as claimed in claim 2, in which said nail-feeding means includes, a nail hopper, a sloped track leading from said hopper to said pickoff mechanism, said latter mechanism serving to pick off nails from the lower end of the track and to alternately drop nails into said tubes.

4. A nailing machine as claimed in claim 3, in which said pickoff mechanism comprises a sloped assembly consisting of a fixed outer ring and coaxial inner rotatable disc, the outer edge of the disc being notched at two points 120° apart with notches large enough to accommodate the shanks of said nails but smaller than the heads of said nails, the inner face of said ring being notched at two points 120° apart and spaced 120° from the lower end of said sloped track with notches larger than said nailheads, said latter notches being positioned over the open upper ends of said tubes, and means for rotating said disc relative to said ring through 120°, whereby rotation of said disc in one direction picks off a nail from said track while simultaneously dropping a nail into one tube and rotation in the other direction picks off a nail from the track while simultaneously dropping a nail into the other tube.

5. A nailing machine as claimed in claim 4, in which said tube for delivering nails to the lower chuck is a two-part tube having a first intermediate part located directly below one of the notches in said ring, and a second part having its upper end positioned directly beneath the lower end of said first intermediate part, and further including a movable plate positioned between the lower end of the first intermediate part and the upper end of the second part, said plate being adapted to hold a nail in said first part while a nail previously delivered to said second part is being forced into the lower chuck by a blast of air, and means for moving said plate away from its position beneath the lower end of the first part to drop nails held therein into said second part, and means for controlling the flow of air into said second part so that said flow is cut off when nails are being dropped from said first part into said second part.

6. A nailing machine as claimed in claim 5, in which said means for rotating said disc comprises a shaft protruding downwardly from the center of said disc, a pinion gear carried by said shaft, and a toothed rack, meshed with said pinion gear, and means for moving said rack back and forth as to rotate said disc through 120° arcs, first in one direction and secondly in the opposite direction.

7. A nailing machine as claimed in claim 3, having a plurality of nail pickoff mechanisms and pairs of chucks, all being operated by a common power train.